United States Patent
Auchter et al.

(10) Patent No.: US 7,445,253 B2
(45) Date of Patent: Nov. 4, 2008

(54) CLAMP FOR FASTENING AND CONNECTING TUBES

(75) Inventors: Holger Auchter, Stuttgart (DE); Michel Brun, Rustenhart (FR)

(73) Assignees: Behr GmbH & Co. KG, Stuttgart (DE); Behr France S.A.R.L., Rouffach (FR)

( * ) Notice: Subject to any disclaimer, the term of this patent is extended or adjusted under 35 U.S.C. 154(b) by 0 days.

(21) Appl. No.: 10/538,884

(22) PCT Filed: Nov. 14, 2003

(86) PCT No.: PCT/EP03/12729

§ 371 (c)(1),
(2), (4) Date: Jun. 14, 2005

(87) PCT Pub. No.: WO2004/055424

PCT Pub. Date: Jul. 1, 2004

(65) Prior Publication Data

US 2006/0066103 A1   Mar. 30, 2006

(30) Foreign Application Priority Data

Dec. 14, 2002   (EP) .................................. 02027991

(51) Int. Cl.
*F16L 25/00*   (2006.01)
(52) U.S. Cl. ......................................... 285/420
(58) Field of Classification Search ............... 285/420, 285/223, 424; 123/470
See application file for complete search history.

(56) References Cited

U.S. PATENT DOCUMENTS

| | | | | |
|---|---|---|---|---|
| 3,479,069 A | * | 11/1969 | Sedam | 285/364 |
| 4,461,499 A | * | 7/1984 | Hunter et al. | 285/364 |
| 4,463,975 A | * | 8/1984 | McCord | 285/419 |
| 4,913,468 A | | 4/1990 | Rattmann | |
| 5,348,353 A | * | 9/1994 | Deweerdt | 285/305 |
| 5,820,168 A | * | 10/1998 | De Giacomoni | 285/192 |
| 5,893,351 A | * | 4/1999 | Akutagawa et al. | 123/470 |
| 6,053,149 A | * | 4/2000 | Lorraine | 123/470 |
| 6,250,693 B1 | * | 6/2001 | Gensert et al. | 285/364 |
| 6,409,228 B1 | * | 6/2002 | Fadini et al. | 285/305 |
| 6,481,420 B1 | * | 11/2002 | Panasuk et al. | 123/470 |
| 6,846,023 B2 | * | 1/2005 | Ebinger et al. | 285/420 |
| 6,874,477 B1 | * | 4/2005 | Lorraine et al. | 123/468 |

FOREIGN PATENT DOCUMENTS

| | | |
|---|---|---|
| CH | 370604 | 7/1963 |
| DE | 30 26 221 A1 | 2/1982 |
| DE | 199 53 129 A1 | 5/2001 |
| FR | 2 188 779 | 1/1974 |
| FR | 2 360 028 | 2/1978 |
| SU | 666363 | 6/1979 |

* cited by examiner

*Primary Examiner*—David E Bochna
(74) *Attorney, Agent, or Firm*—Foley & Lardner LLP

(57) ABSTRACT

A clamp (1) has been provided for fastening and connecting tubes (2,3), especially for fastening a connecting tube to a heat exchanger for a motor vehicle. At least one terminal area (8) of the inventive clamp (1) is bent back.

17 Claims, 2 Drawing Sheets

CLAMP FOR FASTENING AND CONNECTING TUBES

The invention relates to a clamp for fastening and connecting tubes, in particular for fastening a junction tube on a heat exchanger in a motor vehicle.

BACKGROUND OF THE INVENTION

FIGS. 5 to 7 show a conventional built-in clamp 101 which serves for connecting two tubes 102, 103 of a motor vehicle heat exchanger. One of the tubes 102 is provided at its end with a first flange 104. The other second tube 103, introduced slightly into the first tube 102, is provided, somewhat spaced apart from its end, with a periphery bead which forms a second flange 105 and which has a smaller outside diameter than the first flange 104. The clamp 101 is a stamped sheet-metal bent part which is designed symmetrically. The clamp 101 has a plurality of bent-round tabs 106 and two slots 107, running in the longitudinal direction of the clamp 101, in the end region 108 of the clamp 101, for positioning the clamp 101 and for pressing the two tubes 102, 103 together. To simplify assembly, the clamp 101 is provided in each case in the end region 108 with an introduction slope 109. Furthermore, all the edges are rounded for easier handling. A clamp of this type can be handled easily, but still leaves much to be desired with regard to misuse, such as the clamp being inadvertently pulled off.

SUMMARY OF THE INVENTION

The object of the invention is to make available an improved clamp for fastening and connecting tubes.

This object is achieved by means of a clamp having the features of claim 1. Advantageous refinements are the subject matter of the subclaims.

According to the invention, a clamp for fastening and connecting tubes is provided, in which at least one end region of the clamp is bent back. The clamp in this case surrounds the two tubes preferably pushed somewhat one into the other. The bent-back end region in this case preferably bears against the outer surface area of a flange of at least one of the tubes to be connected. In spite of an introduction slope which is reduced, as compared with the prior art, the clamp can be attached to the prepositioned tubes and snapped in in a simple way. Since the end region projects outward to a lesser extent, the clamp cannot so easily be grasped and removed, and it is therefore more reliable in terms of misuse. The end region of the bent-round end of the clamp is also supported on the flange or the bead of the tube and, in the attempt to remove the clamp, claws into the tube, so that it becomes more difficult to remove the clamp.

Preferably, the clamp has a sharp edge in the back-bent end region, in particular in the bearing region against the flange. When the clamp snaps into its end position during assembly, preferably a slight plastic deformation of the flange occurs due to the engagement of the sharp edge, that is to say the clamp "bites" firmly on the flange.

To increase reliability with regard to unauthorized removal, no or only a maximum of one outwardly projecting tab is provided on the clamp, so that it becomes more difficult to remove the clamp because of a lack of possibilities for grasping it.

Preferably, the end regions of the clamp are bent back in such a way that they form approximately the shape of a rounded triangle, preferably none of the angles of the triangle being greater than 90°. Preferably, the triangle is approximately equilateral, that is to say all the angles lie in the range of about 60°±10°. The triangles are in this case formed in a plane perpendicular to the transverse axis.

Preferably, a slot, which runs in the longitudinal direction of the clamp, is provided in the region of at least one end region of the clamp. This slot receives at least one of the flanges, so that the clamp is correctly positioned. The slot preferably runs over two sides of the corresponding triangle, and it terminates approximately in the region of the radially outermost corner of the triangle.

Preferably, the clamp is designed essentially symmetrically with respect to a transverse axis, that is to say even an asymmetrically arranged element, for example a tab, may perfectly well be provided, but the end regions are designed mirror-symmetrically. In this case, in the built-in state, the transverse axis runs parallel to the longitudinal axis of the tubes to be connected and secured.

BRIEF DESCRIPTION OF THE SEVERAL VIEWS OF THE DRAWING

The invention is explained in detail below by means of an exemplary embodiment, with reference to the drawing in which.

DETAILED DESCRIPTION OF THE PREFERRED EMBODIMENTS

Figure 1:
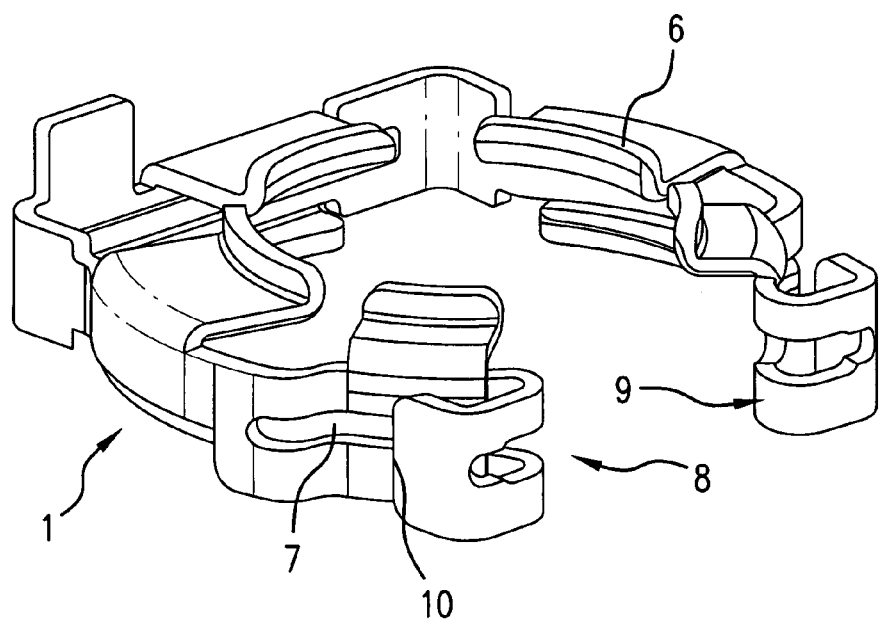
FIG. 1 shows a view of a clamp according to the invention.
Figure 2:
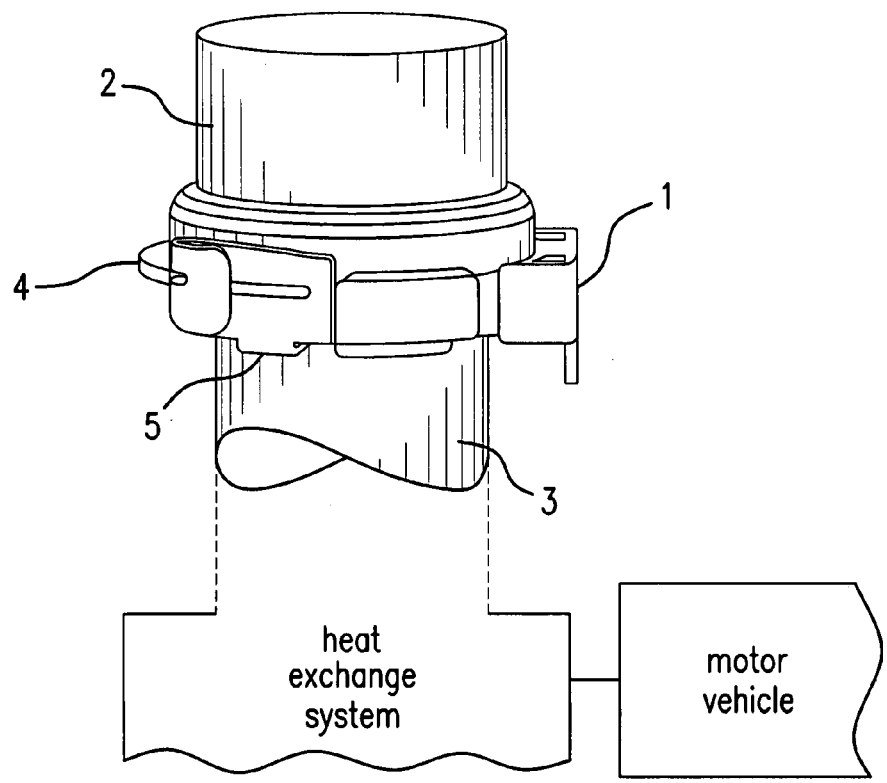
FIG. 2 shows a view of the clamp of FIG. 1 in the built-in state.

A clamp 1 according to the invention, such as is illustrated in FIGS. 1 to 4, serves particularly for connecting two tubes 2 and 3 or one tube to a junction of a motor vehicle heat exchanger. In this case, according to the prior art, one of the tubes 2 is provided at its end with a first flange 4, and the other second tube 3 introduced slightly into the first tube 2 is provided, somewhat spaced apart from this end, with a periphery bead which forms a second flange 5 and which has a smaller outside diameter of the first flange 4.

The clamp 1 is designed essentially symmetrically with respect to the transverse axis. In this case, in the built-in state, the transverse axis runs parallel to the longitudinal axis of the tubes 2, 3 to be connected and secured. The clamp 1 has a plurality of tabs 6 which are bent round and serve for positioning and fixing the tubes 2, 3. Furthermore, designed symmetrically with respect to the transverse axis, two slots 7 running in the longitudinal direction of the clamp 1 are provided in the two end regions 8 of the clamp 1. These slots 7 surround the first flange 4 and serve for positioning and fixing the clamp 1 with respect to the tube 2.

On account of this symmetrical design, only one end region 8 of the clamp 1 is described below.

Figure 3:
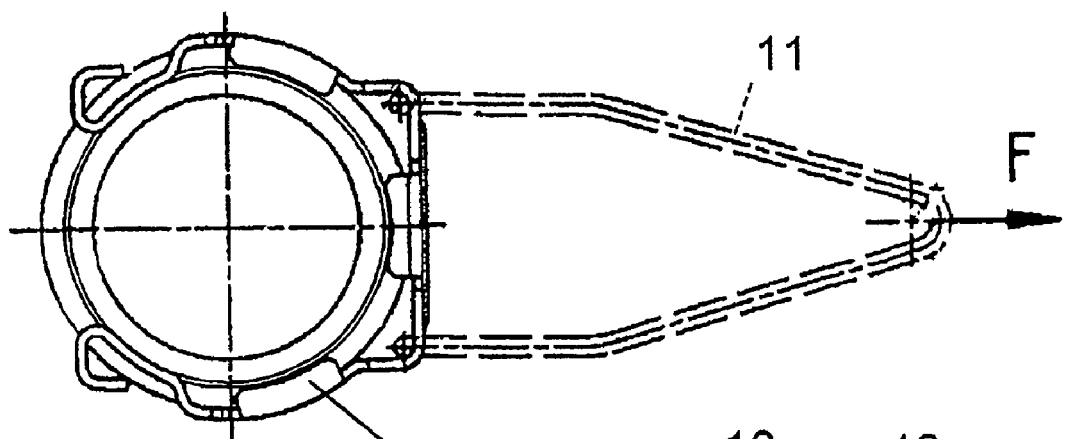
FIG. 3 shows a top view, illustrated in simplified form, of a built-in clamp according to FIG. 2.
Figure 4:
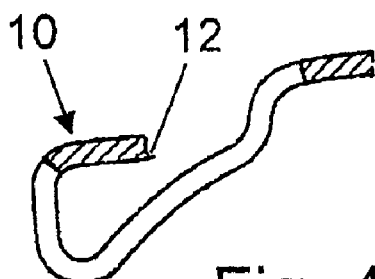
FIG. 4 shows a view of a detail of the clamp of FIG. 1, illustrated in a central section.
Figure 5:
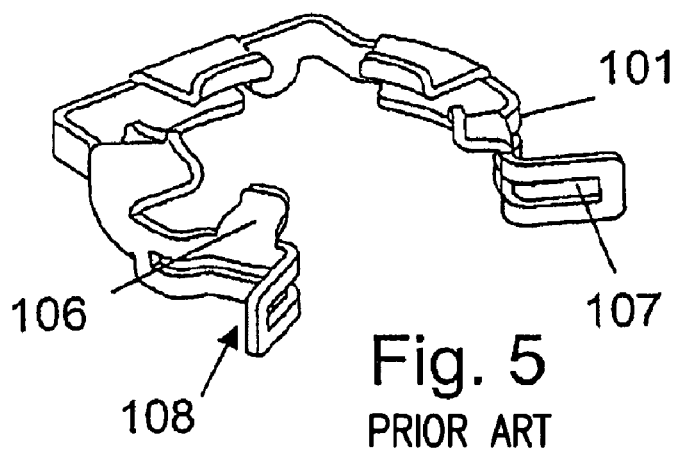
FIG. 5 shows a clamp according to the prior art in a view corresponding to FIG. 1.
Figure 6:
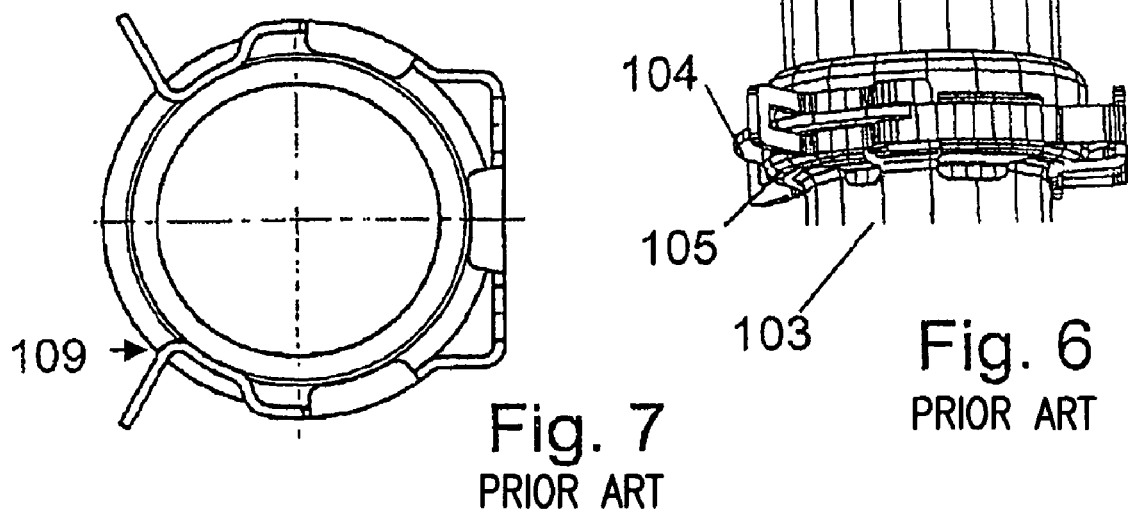
FIG. 6 shows a view of the conventional clamp of FIG. 1 in the built-in state.
Figure 7:
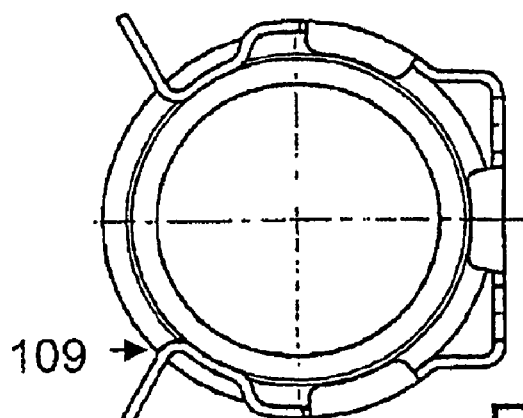
FIG. 7 shows a top view, illustrated in simplified form, of the built-in conventional clamp according to FIG. 6.

As is evident from FIG. 4, the end region 8 of the clamp 1 is bent back. In this case, the end region 8 forms approximately the shape of a rounded right-angled triangle. The slot 7 in this case runs over two of the three triangle sides and terminates approximately in the radially outermost corner. The end 10 of the clamp 1 is bent round to the extent such that it bears with an edge (12) against the flange 4 (cf. FIG. 3). In this case, the edge (12) has a sharp configuration, so that, during assembly, plastic deformations of the flange 4 may occur and the clamp 1 "bites firmly". However, for easier handling, the other edges of the clamp 1 are rounded.

To simplify assembly, a slight introduction slope 9 is provided on the radially inner side of the triangle formed by the end region 8.

For assembly, the tubes 2 and 3 are positioned and the clamp 1 is pushed over them in the manner of a clip. As illustrated in FIG. 3, to verify the connection, the pull-off force is checked by means of a mandrel 11.

LIST OF REFERENCE SYMBOLS

1, 101 Clamp
2, 102 Tube
3, 103 Tube
4, 104 Flange
5, 105 Flange
6, 106 Tab
7, 107 Slot
8, 108 End region
9, 109 Introduction slope
10 End
11 Mandrel

The invention claimed is:

1. A circumferential clamp for fastening and connecting junction tubes on a heat exchanger in a motor vehicle,
   wherein at least one end region of the clamp is bent away from the tubes back toward the body of the clamp;
   wherein the at least one end region of the clamp is bent back in such a way that it forms approximately the shape of a rounded triangle; and
   wherein a slot, which runs in the longitudinal direction of the clamp, is provided in the region of at least one end region of the clamp.

2. The clamp as claimed in claim 1, wherein the bent-back end region of the clamp has at least one sharp edge.

3. The clamp as claimed in claim 1, wherein, in the assembled state, the bent-back end region is in bearing contact against at least one flange or bead of a tube.

4. The clamp as claimed in claim 3, wherein the bent-back end region has a sharp edge in the region of bearing contacts.

5. The clamp as claimed in claim 1, wherein the clamp is designed essentially symmetrically with respect to a transverse axis.

6. The clamp as claimed in claim 1, wherein the rounded triangle is formed by:
   a first bend in the end portion,
   a first portion of the end portion which extends from the clamp to the first bend,
   a second bend in the end portion,
   a second portion of the end portion which extends between the first bend and the second bend, and
   an outermost portion of the end portion which extends from the second bend to the end of the end portion.

7. A tube and clamp assembly comprising:
   a first tube;
   a second tube; and
   a circumferential clamp as claimed in claim 1.

8. A heat exchange system comprising a tube and clamp assembly according to claim 7.

9. A motor vehicle comprising a heat exchange system according to claim 8.

10. The tube and clamp assembly as claimed in claim 9, wherein the rounded triangle is formed by:
    a first bend in the end portion,
    a first portion of the end portion which extends from the clamp to the first bend,
    a second bend in the end portion,
    a second portion of the end portion which extends between the first bend and the second bend, and
    an outermost portion of the end portion which extends from the second bend to the end of the end portion.

11. A circumferential clamp for fastening and connecting junction tubes on a heat exchanger in a motor vehicle,
    wherein at least one end region of the clamp is bent away from the tubes back toward the body of the clamp;
    wherein two end regions of the clamp are bent back in such a way that they form approximately the shape of a rounded triangle; and
    wherein a slot, which runs in the longitudinal direction of the clamp, is provided in the region of at least one end region of the clamp and wherein the slot runs over two sides of the corresponding triangle.

12. The clamp as claimed in claim 11, wherein the triangles have no angle above 90°.

13. The clamp as claimed in claim 11, wherein the triangles are approximately equilateral.

14. The clamp as claimed in claim 11, wherein the bent-back end region of the clamp has at least one sharp edge.

15. The clamp as claimed in claim 11, wherein, in the assembled state, the bent-back end region is in bearing contact against at least one flange or bead of a tube.

16. The clamp as claimed in claim 15, wherein the bent-back end region has a sharp edge in the region of bearing contacts.

17. The clamp as claimed in claim 11, wherein the clamp is designed essentially symmetrically with respect to a transverse axis.

* * * * *